United States Patent
Nagahara et al.

(10) Patent No.: US 12,266,483 B2
(45) Date of Patent: Apr. 1, 2025

(54) CATHODE AND ELECTROLYTIC CAPACITOR

(71) Applicant: Nippon Chemi-Con Corporation, Tokyo (JP)

(72) Inventors: Kazuhiro Nagahara, Tokyo (JP);
Tatsuru Hatae, Kanagawa (JP);
Kazuya Koseki, Kanagawa (JP);
Atsushi Yoshida, Fukushima (JP);
Makoto Tominaga, Fukushima (JP)

(73) Assignee: Nippon Chemi-Con Corporation, Tokyo (JP)

( * ) Notice: Subject to any disclaimer, the term of this patent is extended or adjusted under 35 U.S.C. 154(b) by 0 days.

(21) Appl. No.: 17/765,427

(22) PCT Filed: Sep. 29, 2021

(86) PCT No.: PCT/JP2021/035889
§ 371 (c)(1),
(2) Date: Mar. 30, 2022

(87) PCT Pub. No.: WO2022/071403
PCT Pub. Date: Apr. 7, 2022

(65) Prior Publication Data
US 2022/0367122 A1    Nov. 17, 2022

(30) Foreign Application Priority Data
Sep. 30, 2020 (JP) .................. 2020-165933

(51) Int. Cl.
*H01G 9/055* (2006.01)
*H01G 9/035* (2006.01)
(Continued)

(52) U.S. Cl.
CPC ............. *H01G 9/055* (2013.01); *H01G 9/035* (2013.01); *H01G 9/0425* (2013.01); *H01G 9/145* (2013.01)

(58) Field of Classification Search
CPC ........ H01G 9/048; H01G 9/145; H01G 9/035; H01G 9/055; H01G 9/0425
See application file for complete search history.

(56) References Cited

U.S. PATENT DOCUMENTS 6,519,137 B1 * 2/2003 Nitta ................. H01G 9/15
                                                      29/25.03
8,988,858 B2 * 3/2015 Isii ................... H01G 11/54
                                                      361/508

(Continued)

FOREIGN PATENT DOCUMENTS

CN    104282872 A   *  1/2015   ............ H01G 11/24
CN    110491674 A   * 11/2019
(Continued)

OTHER PUBLICATIONS

Machine translation obtain in Nov. 2023 of CN 110491674A which was published on Nov. 22, 2019 (Year: 2019).*

(Continued)

*Primary Examiner* — David M Sinclair
(74) *Attorney, Agent, or Firm* — Potomac Law Group, PLLC

(57) ABSTRACT

A cathode and an electrolytic capacitor including the cathode which can suppress production of hydrogen gas are provided. The cathode of the electrolytic capacitor comprising cathode foil formed of valve action metal, and a conductive layer formed on a surface of the cathode foil. When current in a range of current density of leakage current of the electrolytic capacitor flows by electrochemical polarization, potential corresponding to said current is at a higher side (Continued)

than a natural immersion potential of reference cathode foil formed of the valve action metal with purity of 99.9%.

4 Claims, 25 Drawing Sheets

(51) Int. Cl.
*H01G 9/042* (2006.01)
*H01G 9/145* (2006.01)

(56) References Cited

U.S. PATENT DOCUMENTS

| | | | |
|---|---|---|---|
| 9,105,401 B2 | 8/2015 | Dreissig et al. | |
| 2004/0262566 A1* | 12/2004 | Takaoka | H01G 9/035 252/500 |
| 2006/0098384 A1 | 5/2006 | Takeda et al. | |
| 2009/0034160 A1 | 2/2009 | Takeda et al. | |

FOREIGN PATENT DOCUMENTS

| | | | |
|---|---|---|---|
| JP | S54-061231 U1 | | 4/1979 |
| JP | H11-026307 A | | 1/1999 |
| JP | H11-067600 A | | 3/1999 |
| JP | 2000-012397 A | | 1/2000 |
| JP | 2004-165203 A | | 6/2004 |
| JP | 2005223197 A | * | 8/2005 |
| JP | 2017-034030 A | | 2/2017 |
| KR | 100778063 B1 | * | 11/2007 |
| KR | 20180061670 A | * | 6/2018 |
| WO | WO 2007/037396 A1 | | 4/2007 |

OTHER PUBLICATIONS

International Search Report from International Patent Application No. PCT/JP2021/035889, Dec. 21, 2021.
Notice of Reasons for Refusal issued Aug. 17, 2021, in Japanese Patent Application No. 2020-165933.
Extended European search report issued Dec. 8, 2022, for European Patent Application No. 21870517.6.
Office Action issued Aug. 3, 2022, for Taiwanese Patent Application No. 110136444.
Office Action issued May 29, 2024, for Chinese Patent Application No. 202180005497.4.

* cited by examiner

CATHODE AND ELECTROLYTIC CAPACITOR

FIELD OF INVENTION

The present disclosure relates to a cathode included in an electrolytic capacitor and said electrolytic capacitor.

BACKGROUND

Electrolytic capacitors include valve action metal, such as tantalum and aluminum, as anode foil and cathode foil. Surfaces of the anode foil are enlarged by shaping the valve action metal into sintered bodies or etching foils, and the enlarged surface has a dielectric oxide film layer thereon. Electrolyte solution intervenes between the anode foil and the cathode foil. The electrolyte solution closely contacts the concaved and convexed surface of the anode foil and acts as a true cathode.

The electrolytic solution repairs deteriorated portion of the dielectric oxide film layer formed on the anode foil, such as deterioration and damage, by leakage current. However, hydrogen gas is produced due to the film repairment by the leakage current of the dielectric oxide film layer. That is, at the time of the film repairment by the leakage current, an anode reaction expressed by the following chemical formula (1) occurs at the anode-foil side. Furthermore, at the time of the film repairment by the leakage current, a cathode reaction expressed by the following chemical formula (2), in which electrons produced in the anode reaction are received and hydrogen ions are reduced, occurs at the cathode-foil side. Atomic hydrogen produced in the chemical formula (2) is bonded as expressed in the following chemical formula (3), such that hydrogen gas is produced.

$$2Al + 3H_2O \rightarrow Al_2O_3 + 6H^+ + 6e^- \quad (1)$$

$$6H^+ + 6e^- \rightarrow 6H_{ad} \quad (2)$$

$$6H_{ad} \rightarrow 3H_2 \quad (3)$$

The hydrogen gas raises the inner pressure of the electrolytic capacitor, and may cause expansion of casings housing capacitor elements therein and expansion of sealing bodies sealing capacitor elements or may open pressure release valves provided in the electrolytic capacitor. When the leakage current increases as the anode-foil side and the transfer of charges on electrode surfaces at the anode-foil side becomes intense, the amount of reaction at the cathode foil side also becomes large according to Faraday's law, and the amount of gas produced at the cathode-foil side increases.

PRIOR ART DOCUMENT

Patent Document

Patent Document 1: Japanese Laid-Open APPLICATION 2017-34030

SUMMARY OF INVENTION

Problems to be Solved by Invention

In recent years, there are cases in which withstand voltage of 100 V or more is required for the electrolytic capacitor for uses in vehicles such as electric cars and in electric power, etc. Accordingly, the electrolytic capacitor for use in medium and high voltage of 100 V or more includes an enlarged surface layer formed by a number of tunnel-shaped pits on the anode foil. Furthermore, the electrolytic capacitor includes the enlarged surface having the tunnel-shaped pits which penetrate the foil, partially or all over the anode foil. By such enlargement technique, in the electrolytic capacitor for use in medium and high voltage of 100 V or more, the thickness of the dielectric oxide film layer is ensured, while attempting to enlarge the surface of the anode foil.

When further capacitance is required for the electrolytic capacitor for use in medium and high voltage of 100 V or more, the dielectric oxide film layer may be thinned. However, the dielectric oxide film layer is made thinner, the valve action metal and water in the electrolyte solution easily get in contact with each other, and the anode reaction expressed by the above chemical formula (1) easily occurs, causing a problem that the production amount of hydrogen gas increases. In particular, the production of hydrogen gas due to such an anode reaction is observed in the electrolytic capacitor for use in medium and high voltage of 160 V or more, and is significantly observed in electrolytic capacitor for use in medium and high voltage of 250 V or more.

Nitro compounds may be added to the electrolyte solution in combination. The nitro compound is reduced at the cathode side and reacts with hydrogen ions. Therefore, the nitro compound suppresses the production of hydrogen gas. However, withstand voltage of the electrolytic capacitor may be decreased depending on types of the nitro compounds, limiting the usage amount thereof. Furthermore, the nitro compound is reduced at the cathode side over time, and the hydrogen gas suppression performance drops.

Accordingly, a new method that can suppress the hydrogen gas more preferably is demanded for the electrolytic capacitor. The present disclosure is suggested to address the above problems. The objective is to provide a cathode that can suppress the production of hydrogen gas, and the electrolytic capacitor including the cathode.

Means to Solve the Problem

Firstly, a definition of a capacity appearance rate is described. The capacity appearance rate is a ratio of capacitance of an electrolytic capacitor relative to capacitance at the anode side. That is, the capacity appearance rate is a percentage of a ratio obtained by subtracting anode-side capacitance from synthetic capacitance of the electrolytic capacitor which is regarded as a capacitor in which the anode side and the cathode side are connected in series. The synthetic capacitance can be obtained by subtracting a sum of anode-side capacitance and cathode-side capacitance from a multiplication result of the anode-side capacitance and the cathode-side capacitance. Therefore, the capacity appearance rate is expressed by the following formula 1.

$$\text{Capacity Appearance Rate (\%)} = \frac{\text{Cathode - Side Capacitance}}{\text{Anode - Side Capacitance} + \text{Cathode - Side Capacitance}} \times 100 \quad \text{(Formula 1)}$$

As indicated in Formula 1, when the anode-side capacitance is large, effect of the cathode side relative to the capacity appearance rate is large, and when the anode-side capacitance is small, effect of the cathode side relative to the capacity appearance rate is small.

Here, in the field of electrolytic capacitors, the capacitance per a unit area of anode foil of the electrolytic capacitor for use in medium and high voltage of 100 V or more is smaller than the capacitance per a unit area of the anode foil of the electrolytic capacitor for use in low voltage. This is because dielectric oxide film of a surface of an enlarged layer is thick in the anode foil of the electrolytic capacitor for use in medium and high voltage to ensure withstand voltage. In view of improving the capacity appearance rate, in the electrolytic capacitor for use in low voltage in which the capacitance at the anode side is large, it is effective to increase the capacity at the cathode side in order to increase the capacity appearance rate. However, in the electrolytic capacitor for use in medium and high voltage in which the capacitance at the anode side is small, the effect of the capacity appearance rate is small even if the capacitance at the cathode side is improved.

For example, in the electrolytic capacitor for use in low voltage, if anode foil with the capacitance per 1 $cm^2$ of 10 µF is used, the capacity appearance rate when cathode foil with the capacitance per 1 $cm^2$ of 100 µF is used is 90.9%, and the capacity appearance rate when cathode foil with the capacitance per 1 $cm^2$ of 1000 µF is used is 99.0%. This means that the capacity appearance rate was improved by 109%. In contrast, in the electrolytic capacitor for use in middle and high voltage, if anode foil with the capacitance per 1 $cm^2$ of 1 µF is used, the capacity appearance rate when cathode foil with the capacitance per 1 $cm^2$ of 100 µF is used is 99.0%, and the capacity appearance rate when cathode foil with the capacitance per 1 $cm^2$ of 1000 µF is used is 99.9%. This means that the capacity appearance rate hardly improves.

In the electrolytic capacitor for use in middle and high voltage in which the effect of the capacity appearance rate is low even when the capacitance at the cathode side is improved, the conductive layer to enlarge the surface area was not formed on the surface of the cathode foil when considering an increase in the number of processes, etc.

Meanwhile, as a result of research, the inventors have discovered that the production of hydrogen gas can be suppressed only by including the conductive layer on the surface of the cathode foil and adjusting the natural immersion potential of the cathode foil.

The present disclosure is based on this discovery, and in order to address the above problems in the electrolytic capacitor for used in middle and high voltage of 100 V or more, especially 160 V or more, and more especially 250 V or more, a cathode of an electrolytic capacitor of the present disclosure is a cathode of an electrolytic capacitor and includes:

cathode foil formed of valve action metal; and
a conductive layer formed on a surface of the cathode foil,
in which when current in a range of current density of leakage current of the electrolytic capacitor flows by electrochemical polarization, potential corresponding to said current is at a higher side than a natural immersion potential of reference cathode foil formed of the valve action metal with purity of 99.9%.

A range of current density of the leakage current of the electrolytic capacitor may be equal to or more than 0.1 $\mu A \cdot cm^{-2}$ and equal to or less than 0.3 $\mu A \cdot cm^{-2}$.

When current in a range of current density of leakage current of the electrolytic capacitor flows by electrochemical polarization, if the electrolyte solution includes a nitro compound, potential corresponding to said current may be at the higher side than the natural immersion potential of the reference cathode foil by 0.15 V or more.

When current in a range of current density of leakage current of the electrolytic capacitor flows by electrochemical polarization, if the electrolyte solution does not include a nitro compound, potential corresponding to said current may be at the higher side than the natural immersion potential of the reference cathode foil by 0.3 V or more.

In a polarization curve, the range of current density of leakage current of the electrolytic capacitor, and a potential range in which current produced by cathode reaction which reduces dissolved oxygen in the electrolyte solution is larger than current produced by cathode reaction which reduces hydrogen ions may correspond with each other.

The valve action metal may be aluminum.

Natural oxide film may be formed on the reference cathode foil.

The electrolytic capacitor including such cathode foil is also an aspect of the present disclosure. The electrolytic capacitor may include a capacitor element including anode foil on which dielectric oxide film is formed and the cathode foil, and an electrolyte and a nitro compound filled in the capacitor element.

Effect of Invention

According to the present disclosure, the production of hydrogen gas can be suppressed only by adjusting the potential of the cathode foil.

EMBODIMENTS

Figure 1:
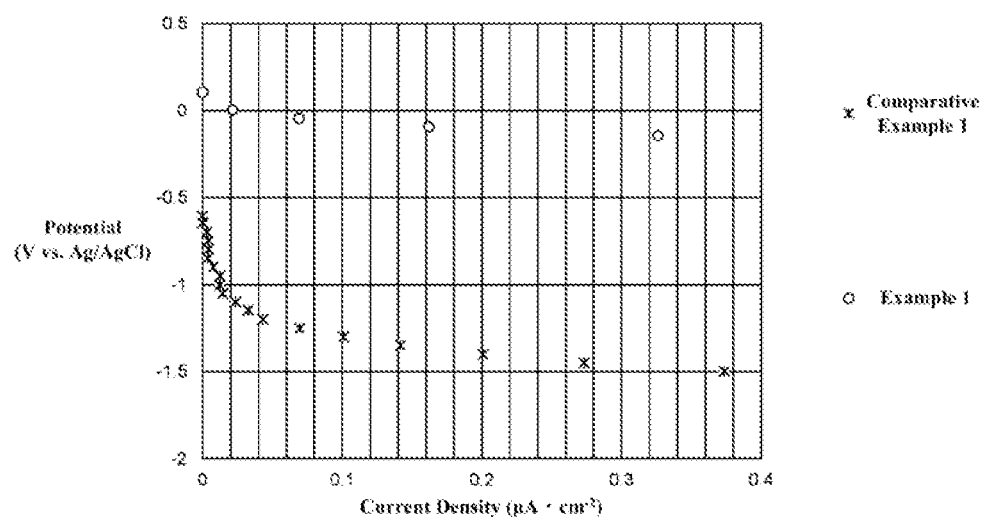
FIG. 1 is a polarization curve in a range of 0 to 0.4 $\mu A \cdot cm^{-2}$ when cathode foil of an example 1 and a reference cathode foil of a comparative example 1 are immersed in electrolyte solution not including a nitro compound.

In below, a cathode and an electrolytic capacitor according to embodiments of the present disclosure will be described. Note that the present disclosure is not limited to the below embodiments.

(Cathode)

A cathode is an electrode arranged at a cathode side of the electrolytic capacitor. For example, the electrolytic capacitor in which the cathode is arranged may be electrolytic capacitors using electrolyte solution, gel electrolytes, or both, and so-called hybrid-type electrolytic capacitors using conductive polymers and solid electrolytes including electrolyte solution or gel electrolytes.

The cathode includes cathode foil formed of valve action metal. The cathode foil is a current collector, and is connected to a lead terminal using various schemes such as cold pressure welding and stitch connection when incorporated in the electrolytic capacitor. The valve action metal is aluminum, tantalum, niobium, niobium oxide, titanium, hafnium, zirconium, zinc, tungsten, bismuth, and antimon, etc. The purity of the cathode foil is desirably 99% or more, however, impurities such as silicon, iron, copper, magnesium, and zinc, etc., may be included. Note that it is preferable to enlarge a surface of the cathode foil to make the purity of the surface of the cathode foil 99.9% or more.

For example, aluminum material which has a temporary sign defined by JIS standard H0001 of H, that is, H material, and aluminum material which has a temporary sign defined by JIS standard H0001 of O, that is, O material may be used for the cathode foil. By using metal foil with high rigidity formed of H material, the transformation of the cathode foil by stamping can be suppressed.

The valve action metal is extended in a foil shape to form the cathode foil. The surface of the cathode foil may be enlarged. An enlarged layer of the cathode foil is formed by electrolytic etching, chemical etching, and sandblasting, etc., or is formed by vapor depositing or sintering metal particles, etc., on the metal foil. The electrolytic etching may be schemes such as DC etching or AC etching. Furthermore, in the chemical etching, the metal foil is immersed in acid solution or alkali solution. The formed enlarged surface is a layer region having tunnel shaped etching pits or spongy etching pits which are dug from the surface of the foil toward a core of the foil. Note that the etching pits may be formed so as to penetrate the cathode foil.

Oxide film may be naturally or intentionally formed on the enlarged surface. Natural oxide fil is formed by reacting the cathode foil and oxygen in the air, and chemically converted film is oxide film intentionally formed by chemical conversion in which voltage is applied to the cathode foil in solution without halogen ions such as aqueous solution of adipic acid or boric acid. For example, when the metal foil is aluminum foil, oxide film formed by said scheme is aluminum oxide which is the oxidized enlarged layer.

The cathode includes layered structure of the cathode foil and a conductive layer. The conductive layer includes conductive material and is a layer that is more conductive than the oxide film. The conductive layer is layered on one side or both side of the cathode foil and is an outermost surface of the cathode foil. The conductive material may be carbon material, titanium, titanium nitride, titanium carbide, aluminum carbide, or composite material or mixture material thereof. A plurality of the conductive material may be layered.

The carbon material is fibrous carbon, carbon powder, or mixture thereof. The carbon material may be fibrous carbon and carbon powder to which pores are formed by activation process, or opening process to form pores, etc. For example, the carbon powder is natural plant tissues such as coconut husks, synthetic resin such as phenols, activated carbon based on fossil fuel such as coal, coke, and pitch etc., as raw material, carbon black such as ketjen black, acetylene black, and channel black, carbon nanohorn, amorphous carbon, natural graphite, artificial graphite, graphitized ketjen black, and mesoporous carbon, etc. For example, the fibrous carbon is carbon nanotube and carbon nanofiber. The carbon nanotube may be single-walled carbon nanotube in which a graphene sheet is one layer, or multi-walled carbon nanotube in which (MWCNT) in which two layers or more of the graphene sheet are axially round up to form multi-layer tube wall.

The conductive material is attached to the cathode foil by application, vapor deposition, or heat processing, etc. For example, the application is preferred to form the conductive layer of carbon material. Slurry including conductive material, a binder, and solvent is applied on the cathode by doctor blade method or spray atomizing method and dried, and the cathode foil and the conductive are adhered closely if necessary. For example, the vapor deposition is preferred to form the metal conductive layer of titanium, etc., and may be vacuum arc deposition, sputtering deposition, or electron beam deposition. In the heat processing, powder of the conductive material is attached on the surface of the cathode foil and is sintered.

In the vacuum arc deposition, voltage is applied to a material source inside a vacuum chamber to melt and evaporate the material source, and the evaporated material source is reacted with reaction gas, to form film of the material source reacted with reaction gas on the cathode foil. In the sputtering deposition, a target is arranged, plasma is produced under the environment filled with reaction gas, the material source is beaten out from the target, and the beaten-out material source is reacted with reaction gas, to form film of the material source reacted with reaction gas on the cathode foil. In the electron beam deposition, electron beam is irradiated to the material source inside a vacuum chamber to melt and evaporate the material source, and the evaporated material source is reacted with reaction gas, to form film of the material source reacted with reaction gas on the cathode foil.

Here, in the cathode, when the current in a range of current density of the leakage current of the electrolytic capacitor flows, natural immersion potential of the cathode is adjusted to be at the higher side than the natural immersion potential of the reference cathode foil. The reference cathode foil is a reference for comparison of the natural immersion potential of the cathode. The reference cathode foil is formed of the valve action metal of the same kind as the cathode foil of the cathode, and the purity thereof is 99.99% or more.

The potential corresponding to the current in a range of current density of the leakage current of the electrolytic capacitor may be adjusted, for example, by the conductive layer formed on the cathode foil while checking the polarization curve. The cathode and the reference cathode foil are each set as working electrodes, and a silver-silver chloride electrode is set as a reference electrode to measure the natural immersion potential of the reference cathode foil the polarization curve of the cathode. Then, for example, a potential range relative to the range of the current density of the leakage current is adjusted to be at the higher side than the natural immersion potential of the reference cathode foil according to the coverage rate of the conductive layer relative to the cathode foil, the surface area of the conductive layer, or constituent material and inclusion ratio of the conductive layer, etc.

Natural oxide film is formed on the reference cathode foil, and the reference cathode foil has the natural immersion potential in which the cathode reaction which reduces hydrogen ions is dominantly occurs. In contrast, the cathode has the natural immersion potential at the higher side than the reference cathode foil in range of current density of the leakage current. That is, in the range of current density of the leakage current, the cathode is at the higher side than the potential in which the cathode reaction which reduces hydrogen ions is dominantly occurs.

That is, when the leakage current is produced in the electrolytic capacitor, the potential of the cathode is at the higher side than the potential produced by the cathode reaction which reduces hydrogen ions, and is in a potential range at which the cathode reaction which reduces dissolved oxygen dominantly occurs as indicated in the following chemical formula (4). Therefore, the cathode reaction which reduces hydrogen ions is suppressed in this cathode, and the production of hydrogen gas is suppressed.

$$O_2 + 2H_2O + 4e^- \rightarrow 4OH^- \tag{4}$$

Preferably, in a case the electrolyte solution includes nitro compound, the potential of the cathode when the leakage current is flowing is at the higher side than the natural immersion potential of the reference cathode foil by 0.15 V. By adjusting the potential of the cathode to be at the higher side than the natural immersion potential of the reference cathode foil by 0.15 V, the suppression effect for the production of hydrogen gas becomes particularly excellent in comparison with the amount of hydrogen gas produced in the reference cathode foil. Furthermore, in the case the electrolyte solution does not include nitro compound, the potential of the cathode when the leakage current is flowing is at the higher side than the natural immersion potential of the reference cathode foil by 0.3 V. By adjusting the potential of the cathode to be at the higher side than the natural immersion potential of the reference cathode foil by 0.3 V, the suppression effect for the production of hydrogen gas becomes particularly excellent in comparison with the amount of hydrogen gas produced in the reference cathode foil.

Here, the potential corresponding to the range of the leakage current may be adjusted by referring to the natural immersion potential of the reference cathode foil. By adjusting the natural immersion potential of the cathode to be at the higher side than the natural immersion potential of the reference cathode foil, the potential corresponding to the range of the leakage current may be adjusted to be at the higher side than the natural immersion potential of the reference cathode foil. The natural immersion potential of the cathode may be adjusted according to the coverage rate of the conductive layer relative to the cathode foil, the surface area of the conductive layer, or constituent material and inclusion ratio of the conductive layer, etc.

Preferably, the natural immersion potential of the cathode is at the higher side than the natural immersion potential of the reference cathode foil by 0.4 V or more. In the cathode having the natural immersion potential at the higher side than the natural immersion potential of the reference cathode foil by 0.4 V or more, when the leakage current is flowing, the cathode reaction which reduces dissolved oxygen comprises the majority and the cathode reaction which reduces hydrogen ions is largely suppressed, and the suppression effect for the production of hydrogen gas becomes particularly excellent in comparison with the amount of hydrogen gas produced in the reference cathode foil.

In a case the electrolyte solution includes nitro compound, by making the potential of when the leakage current is flowing to be at the higher side than the natural immersion potential of the reference cathode foil by 0.4 V or more, said potential is ensured to be at the higher side than the natural immersion potential of the reference cathode foil by 0.15 V or more, and the suppression effect for the production of hydrogen gas becomes particularly excellent in comparison with the amount of hydrogen gas produced in the reference cathode foil.

Furthermore, in a case the electrolyte solution does not include nitro compound, by making the potential of when the leakage current is flowing to be at the higher side than the natural immersion potential of the reference cathode foil by 0.4 V or more, said potential is ensured to be at the higher side than the natural immersion potential of the reference cathode foil by 0.3 V or more, and the suppression effect for the production of hydrogen gas becomes particularly excellent in comparison with the amount of hydrogen gas produced in the reference cathode foil.

Further preferably, carbon component is included in the conductive layer and the natural immersion potential of the cathode is made to be at the higher side than the natural immersion potential of the reference cathode foil by 0.6 V or more. To include the carbon component means to include carbon material itself in the conductive layer, or to include conductive material including carbon atom in molecular structure, like titanium carbide, in the conductive layer. When the carbon component is included in the conductive layer, in a range in which a difference between the natural immersion potential of the cathode and the reference cathode foil is smaller than 0.6 V, durability of the suppression effect for the production of hydrogen gas becomes shorter as said difference gets closer to 0.6 V. However, when the carbon component is included in the conductive layer, the suppression effect for the production of hydrogen gas rapidly becomes longer when the difference between the natural immersion potential of the cathode and the reference cathode foil becomes equal to or more than 0.6 V, and the suppression effect for the production of hydrogen gas that is longer than that at the range smaller than 0.6 V can be achieved.

When polarization curve is measured with the cathode as a working electrode and a silver-silver chloride electrode as a reference electrode, the natural immersion potential of the cathode is higher than the natural immersion potential of the reference cathode foil, and the polarization curve passes through a region defined by a potential range where the cathode reaction which reduces dissolved oxygen occurs dominantly and the cathode reaction which reduces hydrogen ions is weak, and a current range where the leakage current of the electrolytic capacitor is produced.

Note that a general range of the current density of the leakage current of the electrolytic capacitor is equal to or more than 0.1 $\mu A \cdot cm^{-2}$ and equal to or less than 0.3 $\mu A \cdot cm^{-2}$.

(Electrolytic Capacitor)

The electrolytic capacitor is formed by housing a capacitor element including the cathode in a casing and sealing an opening of the casing by a sealing body. The casing is formed of aluminum, aluminum alloy containing aluminum or manganese, or stainless metal, and is a cylinder with a bottom at one end and the opening at the other end. The opening of the casing is bent and crashed inward by tightening, so that the casing is in close contact with the sealing body. For example, the sealing body is formed by a resin plate including resin such as phenol resin or elastic bodies such as rubber.

The capacitor element includes the cathode, an anode, and a separator. The capacitor element includes an electrolyte filled in air gaps in the capacitor element, and separators. The anode has the dielectric oxide film on the surface thereof. The electrolyte is intervened between the anode and the cathode and is in close contact with the dielectric oxide film.

(Anode)

The anode foil is formed by the dielectric oxide film on a surface of an anode foil made of the valve action metal. The valve action metal is aluminum, tantalum, niobium, niobium oxide, titanium, hafnium, zirconium, zinc, tungsten, bismuth, and antimony, etc. The purity thereof is desirably 99.9% or more for the anode foil, and impurities such as silicon, iron, copper, magnesium, and zinc, etc., may be included thereto.

The anode foil is a molded body formed by molding powder of the valve action metal, a sintered body formed by sintering the molded body, or etched foil which is a rolled foil to which etching process is performed, and the surface thereof is enlarged. The enlarged structure is formed of tunnel-shaped pits, spongy pits, or air gaps between dense powder. Typically, the enlarged structure is formed by DC etching or AC etching in which direct current or alternating current is applied to the foil in acidic aqueous solution having halogen ions, such as hydrochloric acid, or formed by vapor depositing or sintering metal particles, etc., to a core portion. The cathode foil may also have the enlarged structure by etching.

Typically, the dielectric oxide film is oxide film formed on a surface layer of the anode foil. For example, when the anode foil is aluminum foil, the dielectric oxide film is aluminum oxide which is oxidized enlarged structure. The dielectric oxide film is formed by performing chemical conversion in which voltage is applied to the foil in aqueous solution such as adipic acid, boric acid, or phosphoric acid. Furthermore, thinner dielectric oxide film (about 1 to 10 V) may be formed on the surface layer of the cathode foil by chemical conversion, if necessary. In addition, the dielectric oxide film may be created using vapor deposition scheme, sol-gel method, and liquid phase precipitation method, etc.

(Separator)

The separator may be cellulose such as kraft, Manila hemp, esparto, hemp, or rayon, and mixed papers thereof, polyester resin such as polyethylene terephthalate, polybutylene terephthalate, polyethylene naphthalate, and derivatives thereof, polytetrafluoroethylene resin, polyvinylidene fluoride resin, vinylon resin, polyamide resin such as aliphatic polyamide, semi-aromatic polyamide, and aromatic polyamide, polyimide resin, polyethylene resin, polypropylene resin, trimethylpentene resin, polyphenylene sulfide resin, acryl resin, and polyvinyl alcohol resin, etc., and these resin may be used in single or may be mixed.

(Electrolyte)

In a case of the electrolytic capacitor using the electrolytic solution, the electrolyte is electrolytic solution is solvent to which solute, and additives if necessary, are added. The solvent may be any of protic or aprotic polar solvent. The protic polar solvent may be typically monohydric alcohol, polyhydric alcohol, oxy alcohol compound, and water. The aprotic polar solvent may be typically sulfones, amides, lactones, cyclic amides, nitriles, and oxides.

The solute included in the electrolyte solution includes anion and cation component, and typically, may be organic acid or salt thereof, inorganic acid or salt thereof, or complex compound of organic acid and inorganic acid or ion-dissociative salt thereof, and is used in single or in combination of two or more. Acid that is anion and base that is cation may be separately added to the electrolyte solution as solute component.

Furthermore, other additives may be added to the electrolyte solution. The additives may be polyethylene glycol, complex compound of boric acid and polysaccharide (mannite and sorbit, etc.), complex compound of boric acid and polyhydric alcohol, borate ester, nitro compound, phosphate ester, and colloidal silica. They may be used in single or in combination of two or more. The nitro compound suppresses the amount of hydrogen gas produced in the electrolytic capacitor. The nitro compound may be o-nitrobenzoic acid, m-nitrobenzoic acid, p-nitrobenzoic acid, o-nitrophenol, m-nitrophenol, p-nitrophenol, and p-nitrobenzyl alcohol, etc.

When using solid electrolyte for the electrolytic capacitor, conductive polymers that are conjugated polymers or dopes conjugated polymers may be included in the electrolyte layer. Any known material may be used as the conjugated polymers without limitation. For example, the conjugated polymers may be polypyrrole, polythiophene, polyflan, polyaniline, polyacetylene, polyphenylene, polyphenylenevinylene, polyacene, and polythiophenevinylene, and is preferably poly(3,4-ethylenedioxythiphene), etc. These conjugated polymers may be use in single or in combination of two or more, and may be copolymers of two or more types of monomers.

When using gel electrolyte for the electrolytic capacitor, polyvinyl alcohol may be added to the electrolyte solution for high viscosity, or the electrolyte may be formed by the electrolyte solution and polymers with three-dimensional network structure which hold the electrolyte solution. The polymer with three-dimensional structure includes monomers that is a main chain of gel network, polymerization initiator to polymerize the monomers, and crosslinking agent to crosslink the polymer, and is formed by crosslinking the polymer formed by the polymerized monomers.

EMBODIMENTS

In below, the cathode and the electrolytic capacitor of the present disclosure will be described in detail based on examples. Note that the present disclosure is not limited to the examples described in below.

The cathodes of the examples 1 to 6 and the reference cathode foil of the comparative example 1 shown in the below Table 1 are produced.

TABLE 1

| | Cathode Foil | Presence of Enlarged Layer | Type of Conductive Layer | Formation Method of Conductive Layer | Natural Immersion Potentional (mV vs. Ag/AgCl) | |
|---|---|---|---|---|---|---|
| | | | | | Electrolyte Solution Not Including Nitro Compound | Electrolyte Solution Including Nitro Compound |
| Comparative Example 1 | Aluminum | Present | No Conductive Layer | — | −606.4 | −430.2 |
| Example 1 | | Present | Carbon | Application and Pressing | 104.9 | 77.8 |
| Example 2 | | Present | TiN | Vaccum Arc Deposition | −16.2 | −17.9 |
| Example 3 | | Present | TiC | Vaccum Arc Deposition | −182.1 | 70.4 |
| Example 4 | | Not Present | C/Ti | Sputtering Deposition | −20.9 | −40.0 |
| Example 5 | | Present | $Al_4C_3$ + $TiO_2$ | Heat Processing | 185.0 | 127.0 |
| Example 6 | | Not Present | TiN | Eletron Beam Deposition | −11.2 | 10.4 |

As shown in Table 1, the cathode foil including the cathodes of the examples 1 to 6 and the reference cathode foil of the comparative example 1 were aluminum foil with the same shape and size. The enlarged layer was formed on the cathode foil of the examples 1, 3, and 5, and the comparative example 1 by etching process. The enlarged layer was not formed on the cathode foil of the examples 4 and 6.

The conductive layer including carbon black as the carbon material was layered on the surface of the cathode foil of the example 1 by application scheme, and after the layering, the cathode of the example 1 was press-molded. The conductive layer including titanium nitride was layered on the surface of the cathode foil of the example 2 by vacuum arc deposition. The conductive layer including titanium carbide was layered on the surface of the cathode foil of the example 3 by vacuum arc deposition. The conductive layer with two-layer structure of titanium underlayer and carbon material upper layer was formed on the surface of the cathode foil of the example 4 by sputtering deposition. The conductive layer with two-layer structure of aluminum carbide and titanium oxide were formed on the surface of the cathode foil of the example 5 by carbonizing the surface of the aluminum foil by heat processing and coating said surface by powder if titanium oxide. The conductive layer including titanium nitride was layered on the surface of the cathode foil of the example 6 by electron beam deposition.

Furthermore, in the cathode of the examples 1 to 6, the potential corresponding to the range of the leakage current of the electrolytic capacitor was adjusted to be higher than the natural immersion potential of the reference cathode foil of the comparative example 1 by referring to the polarization curve. The polarization curve was measured by 3-electrode method. In detail, the cathodes and the reference cathode foil were each cut into the size of 2×5 and acted as a working electrode, silver-silver chloride electrode acted as a reference electrode, and stainless mesh of SUS304 acted as a counter electrode, said electrodes were immersed in the electrolyte solution. The concentration of dissolve oxygen of the electrolyte solution was adjusted to 0.4 to 1.0 $mgL^{-1}$. Each electrode was connected to potentiometer, and after the natural immersion potential was stabilized, the values of said natural immersion potential was acquired. After the natural immersion potential was stabilized, the potential was polarized from the natural immersion potential toward lower direction by 50 mV until −1.7 V. Each potential with intervals of 50 mV was maintained for 10 minutes, and the average current in the last 1 minute was measured.

Figure 2:
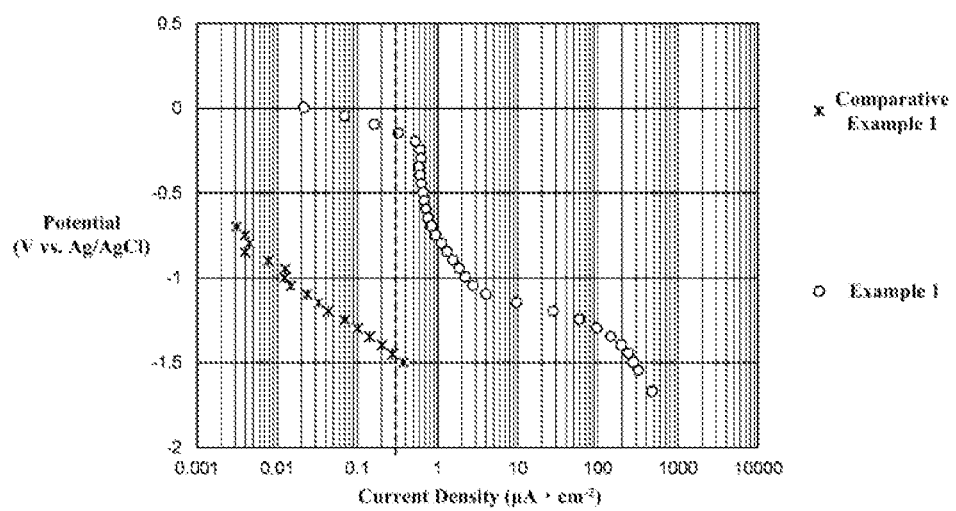
FIG. 2 is a polarization curve in a range of 0.001 $\mu A \cdot cm^{-2}$ or more when cathode foil of an example 1 and a reference cathode foil of a comparative example 1 are immersed in electrolyte solution not including a nitro compound.
Figure 3:
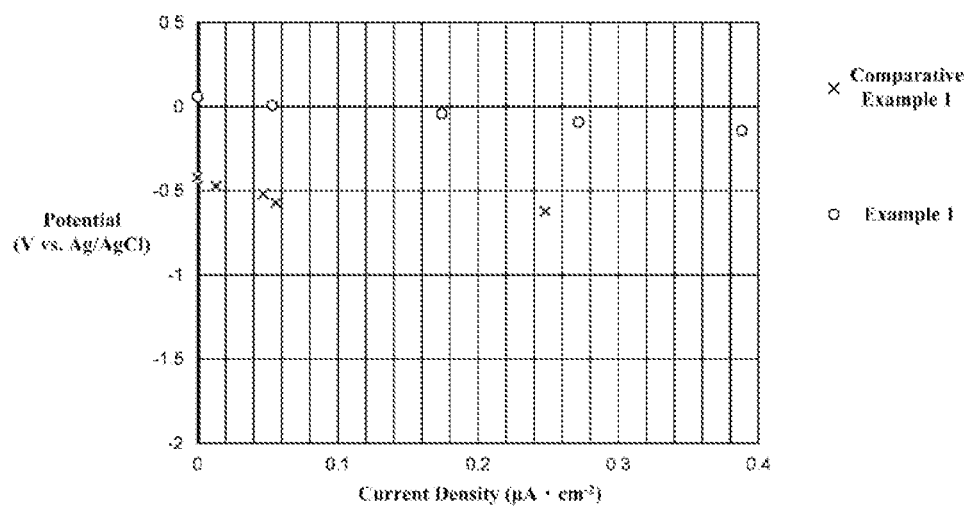
FIG. 3 is a polarization curve in a range of 0 to 0.4 $\mu A \cdot cm^{-2}$ when cathode foil of an example 1 and a reference cathode foil of a comparative example 1 are immersed in electrolyte solution including a nitro compound.
Figure 4:
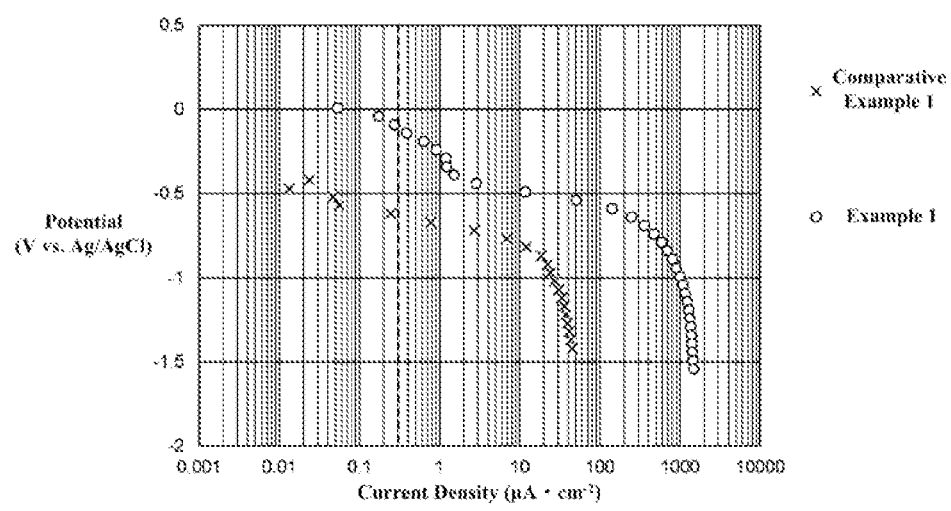
FIG. 4 is a polarization curve in a range of 0.001 $\mu A \cdot cm^{-2}$ or more when cathode foil of an example 1 and a reference cathode foil of a comparative example 1 are immersed in electrolyte solution including a nitro compound.
Figure 5:
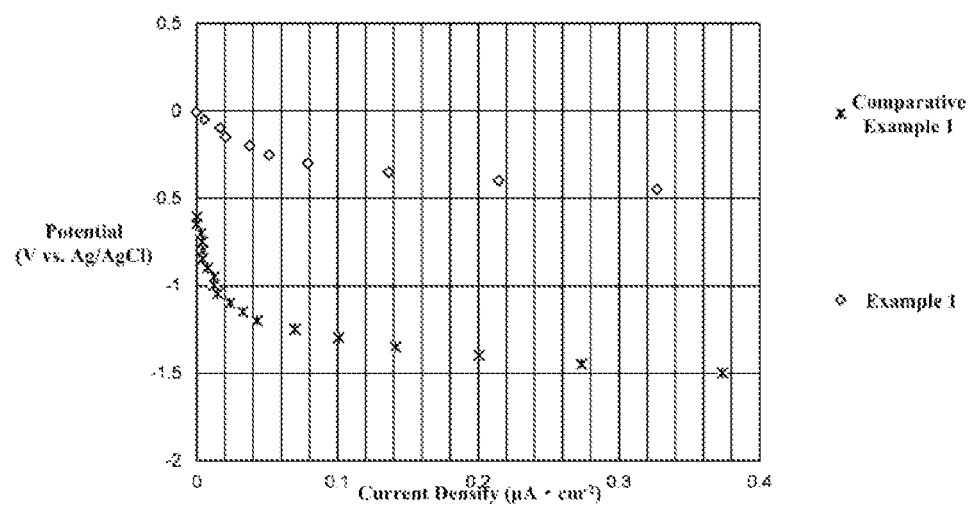
FIG. 5 is a polarization curve in a range of 0 to 0.4 $\mu A \cdot cm^{-2}$ when cathode foil of an example 2 and a reference cathode foil of a comparative example 1 are immersed in electrolyte solution not including a nitro compound.
Figure 6:
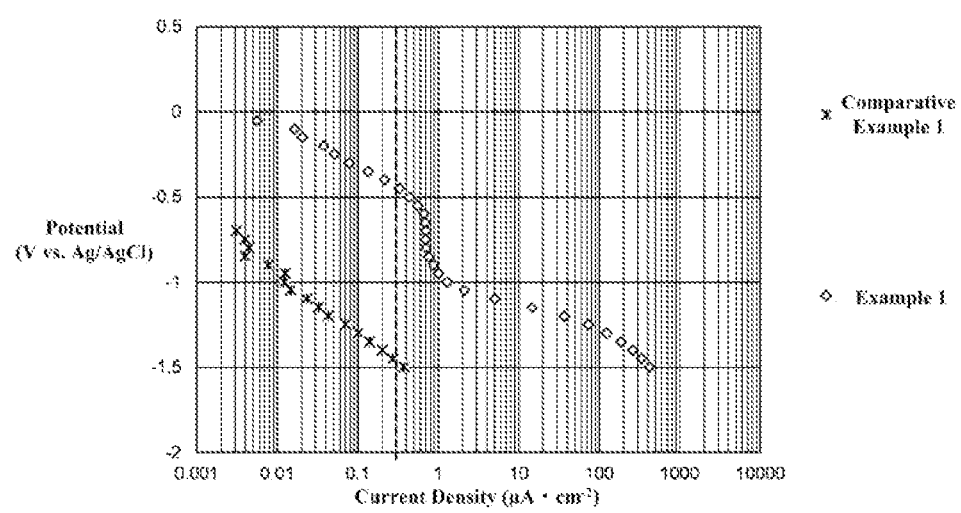
FIG. 6 is a polarization curve in a range of 0.001 $\mu A \cdot cm^{-2}$ or more when cathode foil of an example 2 and a reference cathode foil of a comparative example 1 are immersed in electrolyte solution not including a nitro compound.
Figure 7:
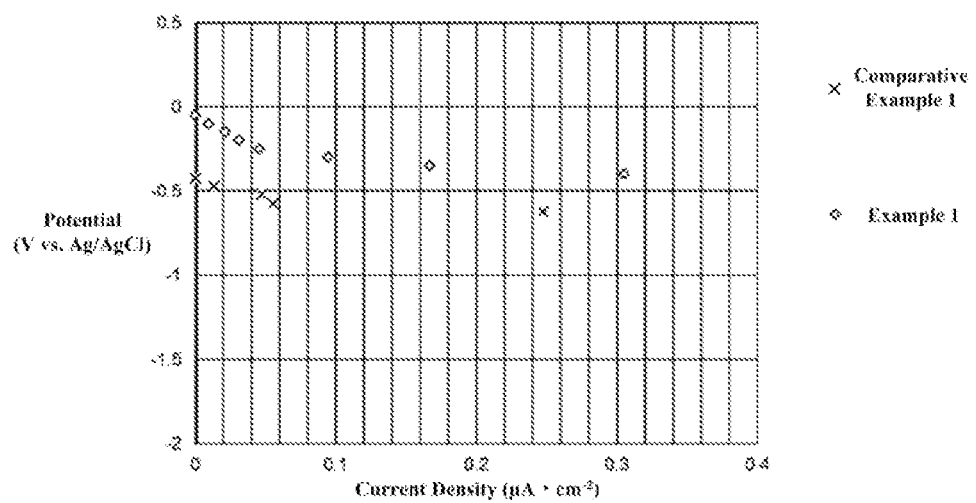
FIG. 7 is a polarization curve in a range of 0 to 0.4 $\mu A \cdot cm^{-2}$ when cathode foil of an example 2 and a reference cathode foil of a comparative example 1 are immersed in electrolyte solution including a nitro compound.
Figure 8:
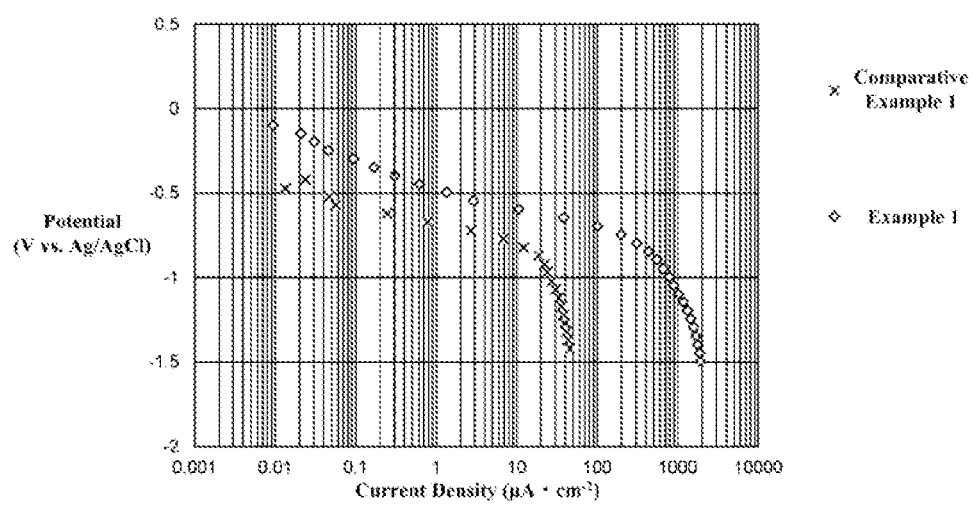
FIG. 8 is a polarization curve in a range of 0.001 $\mu A \cdot cm^{-2}$ or more when cathode foil of an example 2 and a reference cathode foil of a comparative example 1 are immersed in electrolyte solution including a nitro compound.
Figure 9:
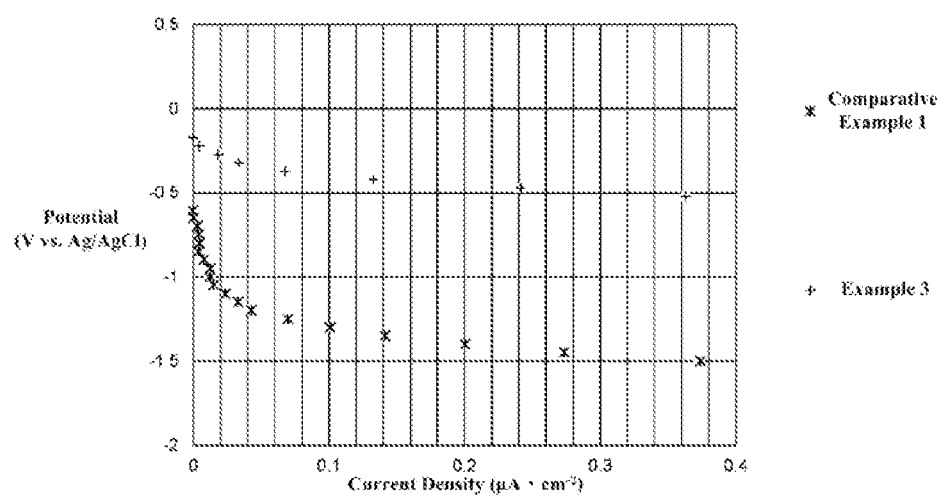
FIG. 9 is a polarization curve in a range of 0 to 0.4 $\mu A \cdot cm^{-2}$ when cathode foil of an example 3 and a reference cathode foil of a comparative example 1 are immersed in electrolyte solution not including a nitro compound.
Figure 10:
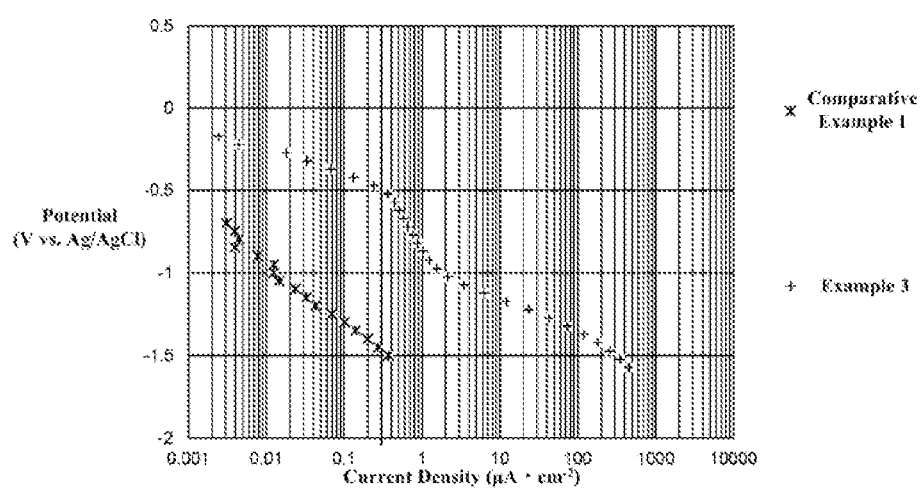
FIG. 10 is a polarization curve in a range of 0.001 $\mu A \cdot cm^{-2}$ or more when cathode foil of an example 3 and a reference cathode foil of a comparative example 1 are immersed in electrolyte solution not including a nitro compound.
Figure 11:
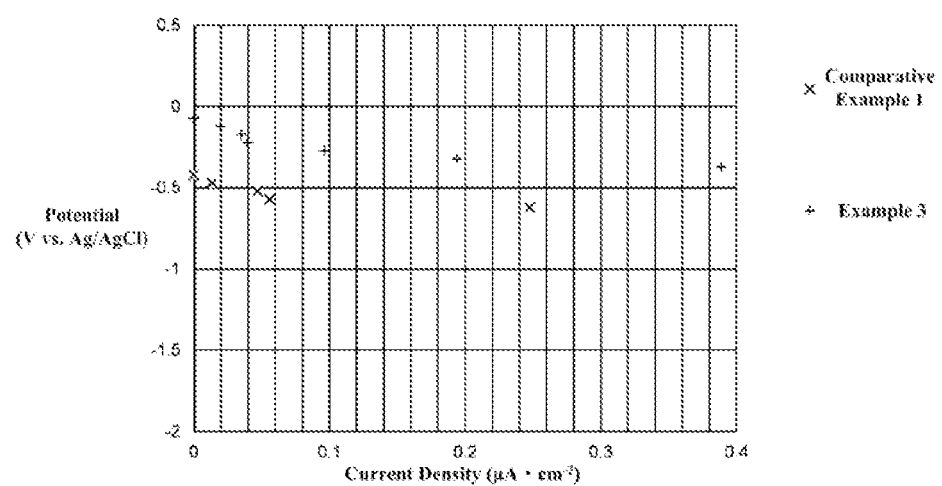
FIG. 11 is a polarization curve in a range of 0 to 0.4 $\mu A \cdot cm^{-2}$ when cathode foil of an example 3 and a reference cathode foil of a comparative example 1 are immersed in electrolyte solution including a nitro compound.
Figure 12:
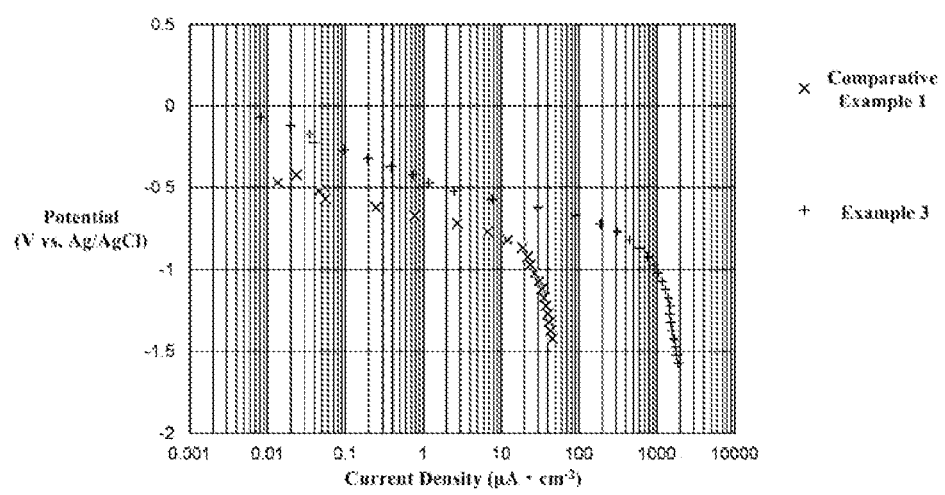
FIG. 12 is a polarization curve in a range of 0.001 $\mu A \cdot cm^{-2}$ or more when cathode foil of an example 3 and a reference cathode foil of a comparative example 1 are immersed in electrolyte solution including a nitro compound.
Figure 13:
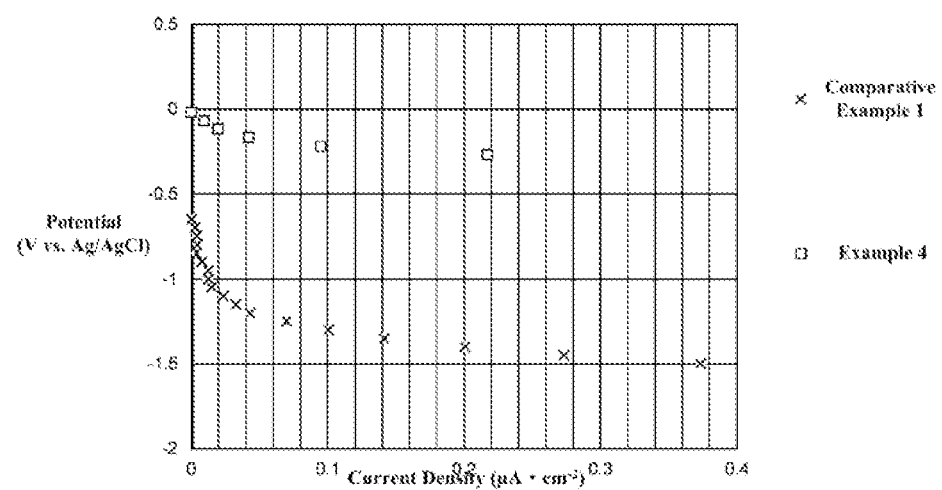
FIG. 13 is a polarization curve in a range of 0 to 0.4 $\mu A \cdot cm^{-2}$ when cathode foil of an example 4 and a reference cathode foil of a comparative example 1 are immersed in electrolyte solution not including a nitro compound.
Figure 14:
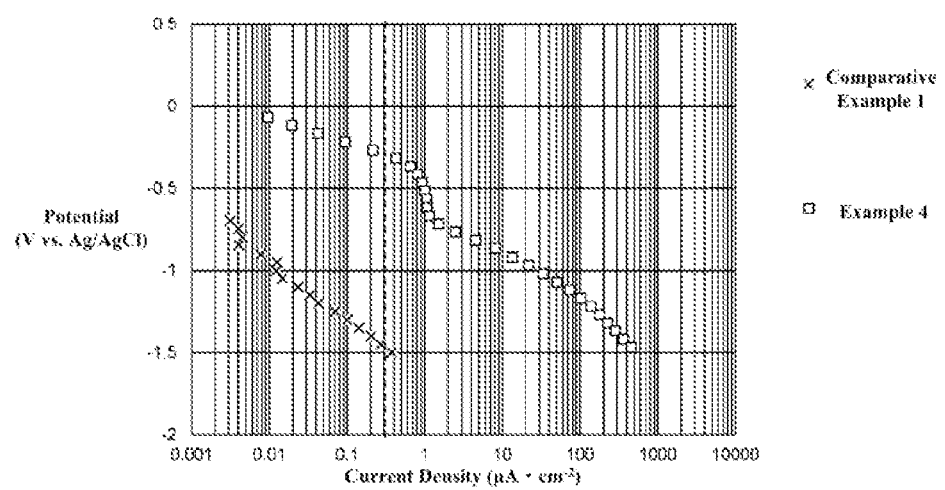
FIG. 14 is a polarization curve in a range of 0.001 $\mu A \cdot cm^{-2}$ or more when cathode foil of an example 4 and a reference cathode foil of a comparative example 1 are immersed in electrolyte solution not including a nitro compound.
Figure 15:
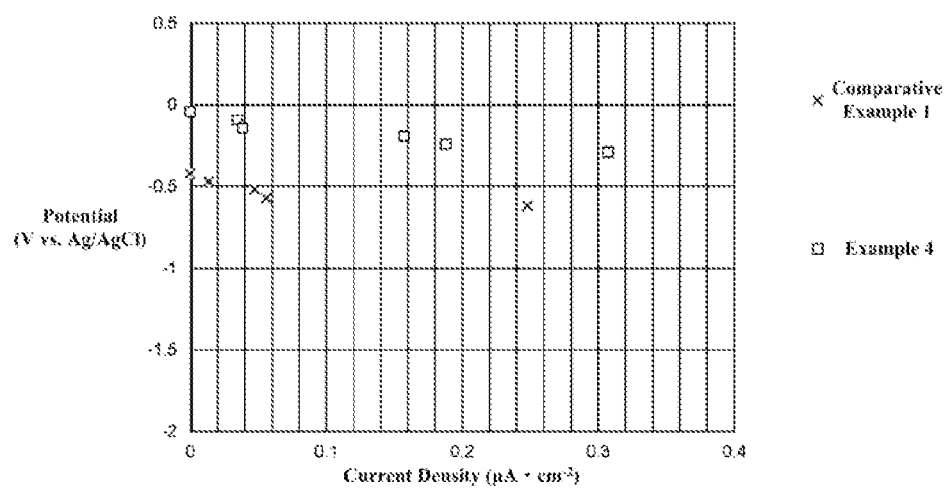
FIG. 15 is a polarization curve in a range of 0 to 0.4 $\mu A \cdot cm^{-2}$ when cathode foil of an example 4 and a reference cathode foil of a comparative example 1 are immersed in electrolyte solution including a nitro compound.
Figure 16:
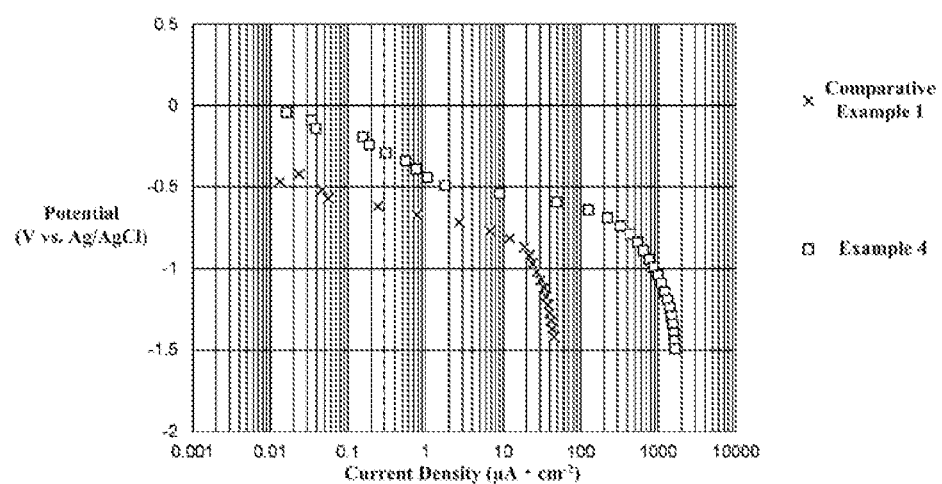
FIG. 16 is a polarization curve in a range of 0.001 $\mu A \cdot cm^{-2}$ or more when cathode foil of an example 4 and a reference cathode foil of a comparative example 1 are immersed in electrolyte solution including a nitro compound.
Figure 17:
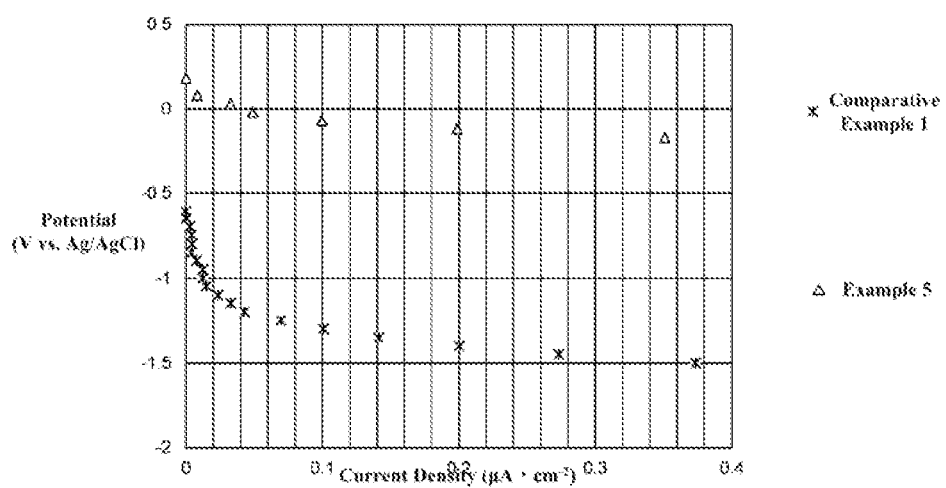
FIG. 17 is a polarization curve in a range of 0 to 0.4 $\mu A \cdot cm^{-2}$ when cathode foil of an example 5 and a reference cathode foil of a comparative example 1 are immersed in electrolyte solution not including a nitro compound.
Figure 18:
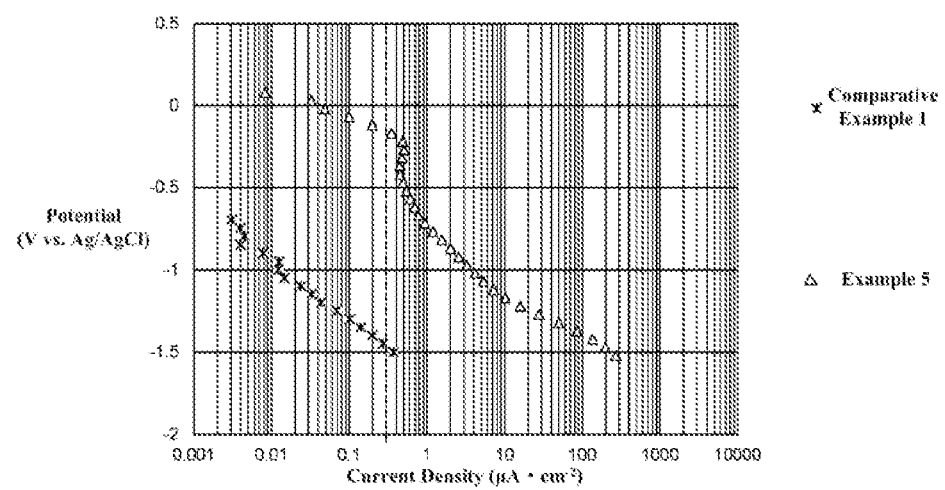
FIG. 18 is a polarization curve in a range of 0.001 $\mu A \cdot cm^{-2}$ or more when cathode foil of an example 5 and a reference cathode foil of a comparative example 1 are immersed in electrolyte solution not including a nitro compound.
Figure 19:
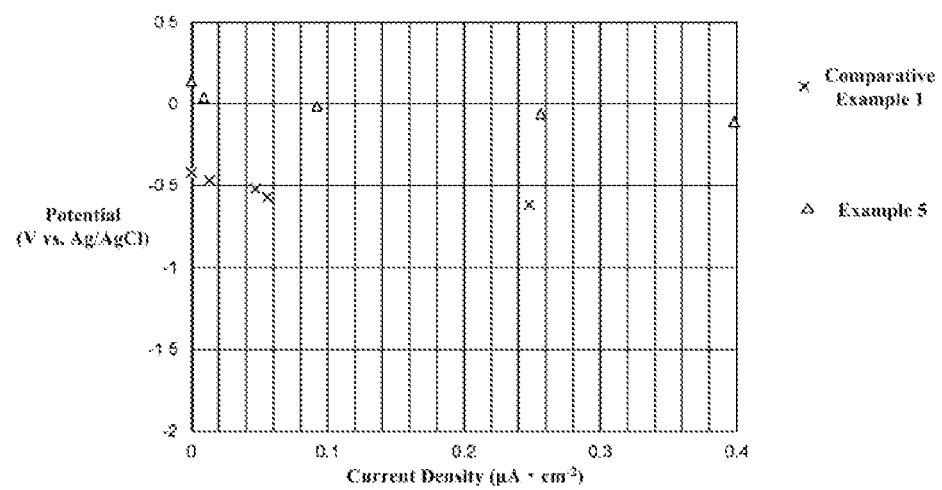
FIG. 19 is a polarization curve in a range of 0 to 0.4 $\mu A \cdot cm^{-2}$ when cathode foil of an example 5 and a reference cathode foil of a comparative example 1 are immersed in electrolyte solution including a nitro compound.
Figure 20:
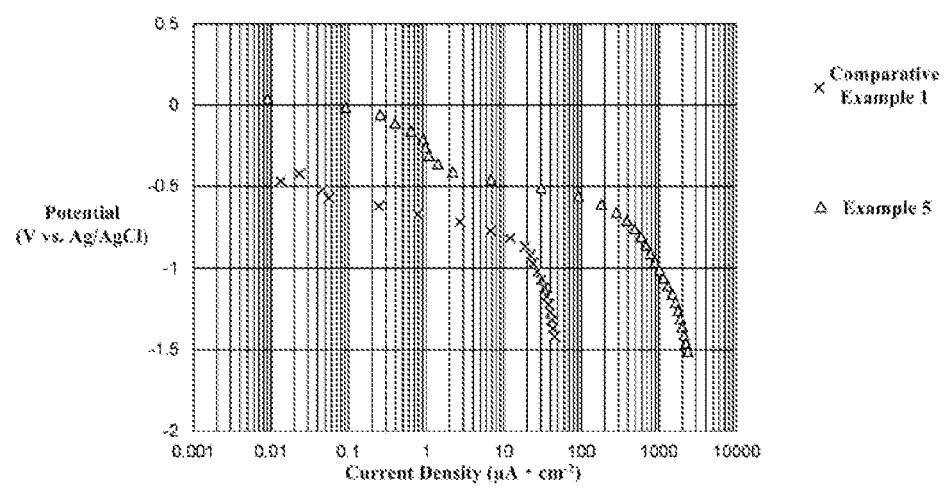
FIG. 20 is a polarization curve in a range of 0.001 $\mu A \cdot cm^{-2}$ or more when cathode foil of an example 5 and a reference cathode foil of a comparative example 1 are immersed in electrolyte solution including a nitro compound.
Figure 21:
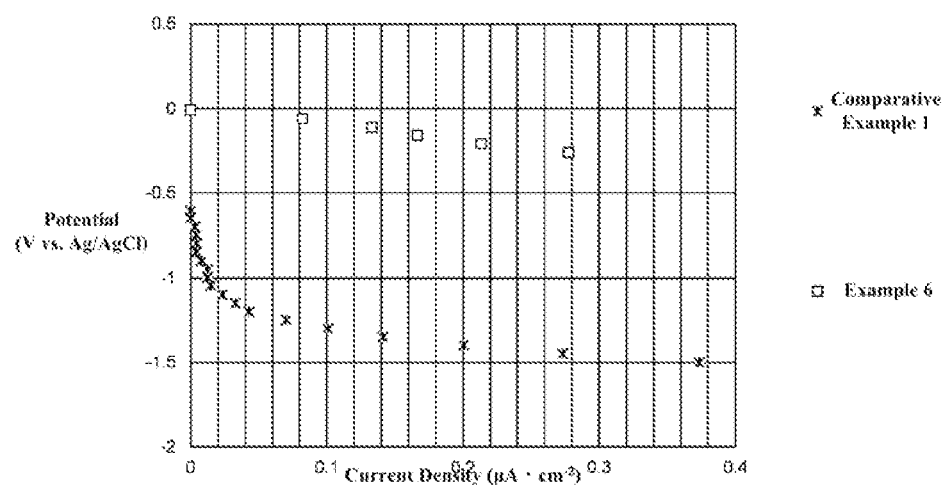
FIG. 21 is a polarization curve in a range of 0 to 0.4 $\mu A \cdot cm^{-2}$ when cathode foil of an example 6 and a reference cathode foil of a comparative example 1 are immersed in electrolyte solution not including a nitro compound.
Figure 22:
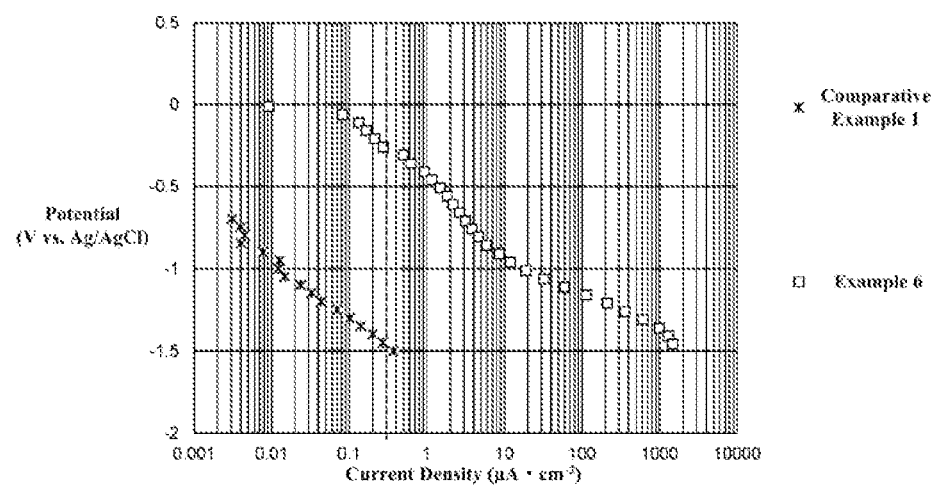
FIG. 22 is a polarization curve in a range of 0.001 $\mu A \cdot cm^{-2}$ or more when cathode foil of an example 6 and a reference cathode foil of a comparative example 1 are immersed in electrolyte solution not including a nitro compound.
Figure 23:
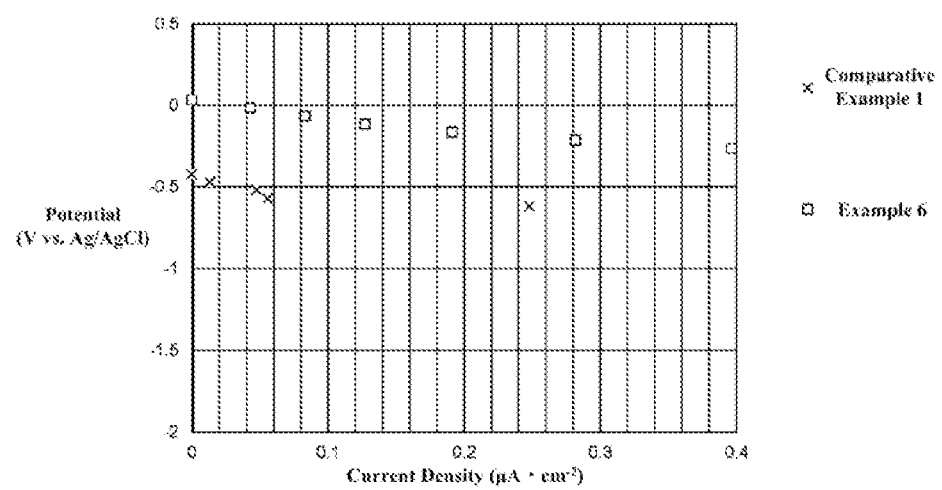
FIG. 23 is a polarization curve in a range of 0 to 0.4 $\mu A \cdot cm^{-2}$ when cathode foil of an example 6 and a reference cathode foil of a comparative example 1 are immersed in electrolyte solution including a nitro compound.
Figure 24:
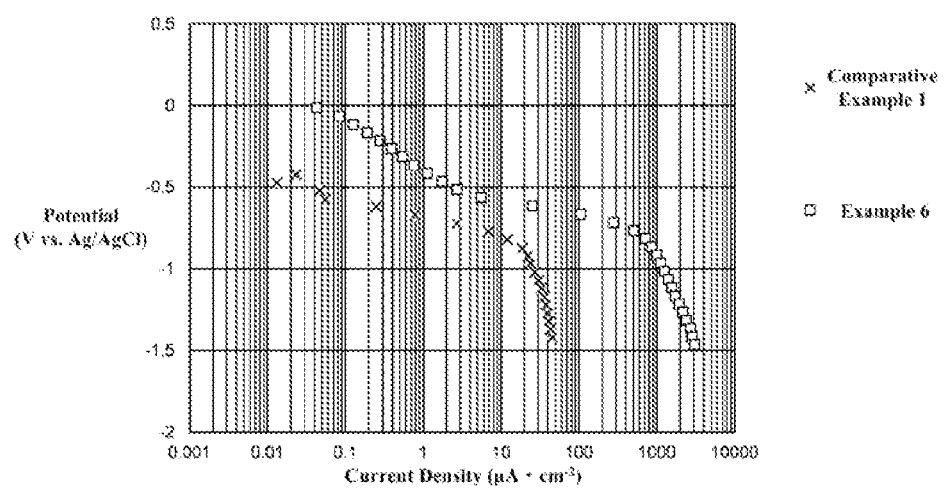
FIG. 24 is a polarization curve in a range of 0.001 $\mu A \cdot cm^{-2}$ or more when cathode foil of an example 6 and a reference cathode foil of a comparative example 1 are immersed in electrolyte solution including a nitro compound.

The measurement result of the polarization curve for the examples 1 to 8 and the comparative example 1 in which the potential was adjusted are shown in graphs of FIGS. 1 to 24. FIG. 4*n*-3) illustrates a polarization curve of when the cathode of the example n (n=1, 2, 3, . . . ) was immersed in the electrolyte solution not including nitro compound in a range of current density of 0 to 0.4 $\mu A \cdot cm^{-2}$ where the natural immersion potential was plotted. FIG. 4*n*-2) illustrates a polarization curve of when the cathode of the example n (n=1, 2, 3, . . . ) was immersed in the electrolyte solution not including nitro compound in a range of current density of 0.001 $\mu A \cdot cm^{-2}$ or more. FIG. 4*n*-1) illustrates a polarization curve of when the cathode of the example n (n=1, 2, 3, . . . ) was immersed in the electrolyte solution including nitro compound in a range of current density of 0 to 0.4 $\mu A \cdot cm^{-2}$ where the natural immersion potential was plotted. FIG. (4*n*) illustrates a polarization curve of when the cathode of the example n (n=1, 2, 3, . . . ) was immersed in the electrolyte solution including nitro compound in a range of current density of 0.001 $\mu A \cdot cm^{-2}$ or more. In FIGS. (4*n*-3) and (4*n*-2), the polarization curve of the reference cathode foil of the comparative example 1 related to the electrolyte solution not including nitro compound is also shown, and in FIGS. (4*n*-1) and (4*n*), the polarization curve of the reference cathode foil of the comparative example related to the electrolyte solution including nitro compound is also shown.

In the polarization curve of FIGS. (4*n*-3) and (4*n*-1), the leftmost plots are the natural immersion potential. As illustrated in FIGS. 1 to 24, it can observed that the cathode of the examples 1 to 6 had the potential at the higher side than the natural immersion potential of the reference cathode foil of the comparative example 1 even in the current density range of 0.1 to 0.3 $\mu A \cdot cm^{-2}$ of the leakage current of the electrolytic capacitor.

Such electrolytic capacitors were produced by using the cathodes of the examples 1 to 6 and the reference cathode foil of the comparative example 1. All electrolytic capacitors were the same except for the difference in the cathodes and the reference cathode foil. Aluminum foil was used for the anodes of the electrolytic capacitors, the enlarged surface layer was formed on said foil, and the dielectric oxide film was further formed thereon. The Kraft separator was sandwiched between the cathode and the anode, and the layered structure of the anode, separator, and cathode was wound. The wounded structure was impregnated with the electrolyte solution to complete the capacitor element. The electrolyte solution was produced by adding azelaic acid to ethylene glycol. There were two types of electrolytic solution, and p-nitrobenzyl alcohol as the nitro compound was added to one of the electrolytic solution in the rate of 2 wt %. The capacitor element was housed in the aluminum casing, and the casing was sealed with the sealing body.

DC voltage of 450 V was applied to the electrolytic capacitors of the examples 1 to 6 and the comparative example 1 at the temperature of 105° C. for 1000 hours to produce the leakage current with current density of 0.1 to 0.3 $\mu A \cdot cm^{-2}$. The height of the casing before and after the application of DC voltage, and the production amount of hydrogen gas was measured from the difference between the height of the casing before and after the application of DC voltage. The production amount of hydrogen gas was evaluated and classified into three classifications of high production, middle production, and low production. The expansion rate of the casing of the electrolytic capacitor of the comparative example 1 was classified as high production as the reference, and the classification for the example 1 to 6 was determined according to the evaluation relative to the comparative example 1 as a reference.

The measurement result of the production amount of hydrogen gas of the examples 1 to 6 and the comparative example 1 is shown in the below Table 2. In the Table, the production amount of hydrogen gas is shown by crosses, triangles, and circles. The cross indicates that the expansion of the casing of the electrolytic capacitor is large, the production amount of hydrogen gas is high, and there was no suppression effect for hydrogen gas. The triangle indicates that the expansion of the casing of the electrolytic capacitor is medium, the production amount of hydrogen gas is medium, and there was suppression effect for hydrogen gas. The circle indicates that the expansion of the casing of the electrolytic capacitor is small, the production amount of hydrogen gas is low, and there was large suppression effect for hydrogen gas. Table 2 also shows the natural immersion potential.

TABLE 2

| | Cathode Foil | Presence of Enlarged Layer | Type of Conductive Layer | Formation Method of Conductive Layer | Natural Immersion Potentional (mV vs. Ag/AgCl vs. Ag/AgCl) | | Supression Effect for Hydrogen Gas (No Nitro Compound) | Supression Effect for Hydrogen Gas (With Nitro Compound) |
|---|---|---|---|---|---|---|---|---|
| | | | | | Electrolyte Solution Not Including Nitro Compound | Electrolyte Solution Including Nitro Compound | | |
| Comparative Example 1 | Aluminum | Present | No Conductive Layer | — | −606.4 | −430.2 | x | x |

TABLE 2-continued

| | Cathode Foil | Presence of Enlarged Layer | Type of Conductive Layer | Formation Method of Conductive Layer | Natural Immersion Potentional (mV vs. Ag/AgCl vs. Ag/AgCl) | | Supression Effect for Hydrogen Gas (No Nitro Compound) | Supression Effect for Hydrogen Gas (With Nitro Compound) |
|---|---|---|---|---|---|---|---|---|
| | | | | | Electrolyte Solution Not Including Nitro Compound | Electrolyte Solution Including Nitro Compound | | |
| Example 1 | | Present | Carbon | Application and Pressing | 104.9 | 77.8 | ○ | ○ |
| Example 2 | | Present | TiN | Vaccum Arc Deposition | −16.2 | −17.9 | Δ | Δ |
| Example 3 | | Present | TiC | Vaccum Arc Deposition | −182.1 | 70.4 | Δ | Δ |
| Example 4 | | Not Present | C/Ti | Sputtering Deposition | −20.9 | −40.0 | Δ | Δ |
| Example 5 | | Present | Al$_4$C$_3$ + TiO$_2$ | Heat Processing | 185.0 | 127.0 | ○ | ○ |
| Example 6 | | Not Present | TiN | Eletron Beam Deposition | −11.2 | 10.4 | ○ | ○ |

As shown in Table 2, when measuring the production amount of hydrogen gas, the production amount of hydrogen gas in the electrolytic capacitors of the examples 1 to 6 was smaller than that in the electrolytic capacitors including the reference cathode foil of the comparative example 1, and it can be observed that the suppression effect for hydrogen gas were present in the examples 1 to 6 in comparison with the comparative example 1. That is, it is observed that the cathode in which the potential relative to the range of the leakage current is at the higher side than the natural immersion potential of the reference cathode foil achieves the effect to suppress hydrogen gas.

In particular, even when the electrolyte solution not including nitro compound were used, there was high suppression effect for hydrogen gas in the electrolytic capacitors of the examples 1, 5, and 6. In the polarization curve of FIGS. (4n-3) and (4n-2), when comparing the potential ranges corresponding to the range of the leakage current, it can be observed that the potential at the higher side than the natural immersion potential of the reference cathode foil of the comparative example 1 by 0.3 V or more was ensured in FIGS. 1, 2, 17, 18, 21, and 22 showing the polarization curve of the examples 1, 5, and 6. That is, under the condition in which the electrolyte solution does not include nitro compound, it was observe that the cathode in which the potential relative to the range of the leakage current was at the higher side than the natural immersion potential of the reference cathode foil by 0.3 V or more achieved particularly high suppression effect for hydrogen gas.

Furthermore, even when the electrolyte solution including nitro compound were used, there was high suppression effect for hydrogen gas in the electrolytic capacitors of the examples 1, 5, and 6. In the polarization curve of FIGS. (4n-1) and (4n), when comparing the potential ranges corresponding to the range of the leakage current, it can be observed that the potential at the higher side than the natural immersion potential of the reference cathode foil of the comparative example 1 by 0.15 V or more was ensured in FIGS. 3, 4, 19, 20, 23, and 24 showing the polarization curve of the examples 1, 5, and 6. That is, under the condition in which the electrolyte solution includes nitro compound, it was observe that the cathode in which the potential relative to the range of the leakage current was at the higher side than the natural immersion potential of the reference cathode foil by 0.15 V or more achieved particularly high suppression effect for hydrogen gas.

Note that, as shown in Table 2, the cathodes of the examples 1 to 6 in which the potential corresponding to the leakage current was at the higher side than the natural immersion potential of the reference cathode foil, the natural immersion potential of the cathodes was also at the higher side than the natural immersion potential of the reference cathode foil.

When the electrolyte solution includes nitro compound, the natural immersion potential of the cathode of the examples 1, 5, and 6 which had been at the higher side than the natural immersion potential of the reference cathode foil of the comparative example 1 by 0.15 V was at the side higher than the natural immersion potential of the reference cathode foil of the comparative example 1 by 0.4 V or more. Furthermore, when the electrolyte solution does not include nitro compound, the natural immersion potential of the cathode of the examples 1, 5, and 6 which had been at the higher side than the natural immersion potential of the reference cathode foil of the comparative example 1 by 0.3 V was at the side higher than the natural immersion potential of the reference cathode foil of the comparative example 1 by 0.6 V or more.

Furthermore, as indicated by the circle and the triangle in Table 2, it was observed that the suppression effect for hydrogen gas in the example 1 was larger than that of the examples 3 and 4. In the examples 1, 3, and 4, carbon component was include in the conductive layer. In detail, in the example 1, carbon itself was included in the conductive layer as the carbon component, in the example 3, titanium carbide including carbon atom was included in the conductive layer as the carbon component, and in the example 4, titanium underlayer and carbon material upper layer was included in the conductive layer as the carbon component. Accordingly, as shown in Table 2, the differences between the natural immersion potential of the cathode and the natural immersion potential of the reference cathode foil of the comparative example 1 were about 0.71 V that was more than 0.6 V in the example 1, about 0.42 V in the example 3, and about 0.56 V in the example 4.

Figure 25:
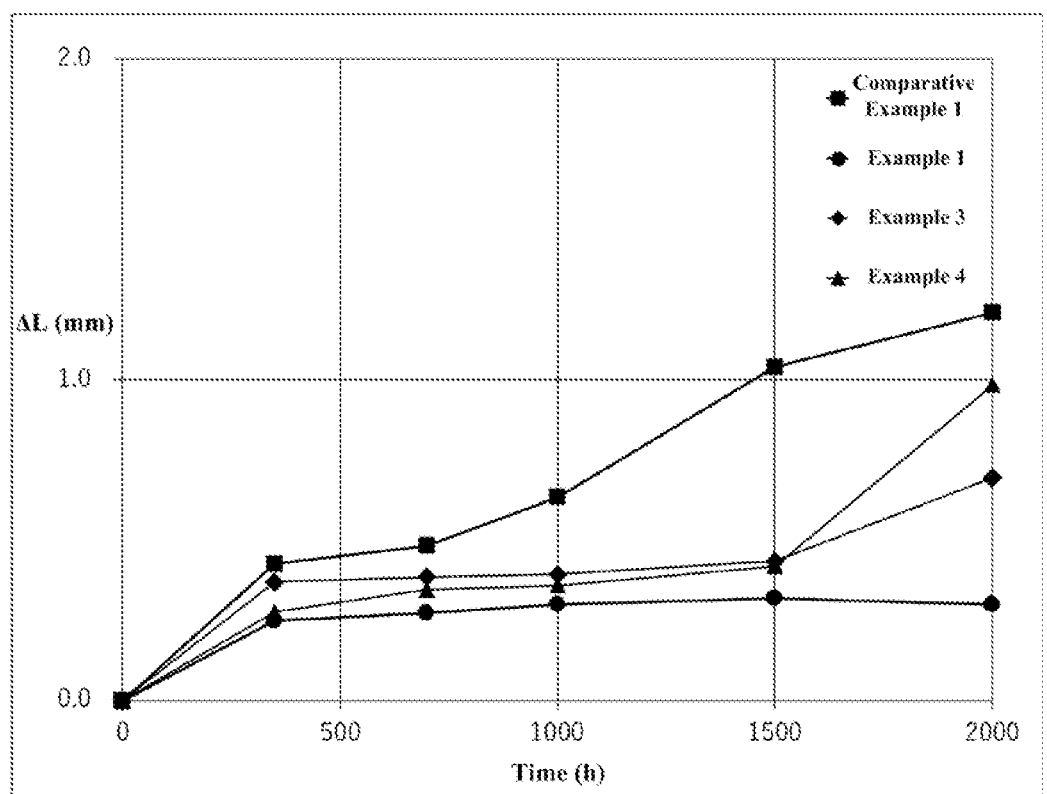
FIG. 25 is a graph indicating time series of change in height of casings before and after DC current was applied to cathode foil of the examples 1, 3, and 4, and the reference cathode foil of the comparative example 1 in order to produce leakage current.

The result of Table 2 is illustrated in a graph of FIG. 25. FIG. 25 is a graph indicating time series of change in the height of the casings before and after DC current was applied, in which DC voltage of 450 V was applied at the temperature of 105° C. for 2000 hours to produce the leakage current with current density of 0.1 to 0.3 μA·cm$^{-2}$.

In FIG. 25, horizontal axis indicated time, and vertical axis a change ΔL in the height of the casing.

As illustrated in FIG. 25, in comparison with the examples 3 and 4 in which the difference between the natural immersion potential of the cathode and the natural immersion potential of the reference cathode foil of the comparative example 1 was less than 0.6 V, the change ΔL in the height of the casing and the production of hydrogen gas were smaller in the example 3 than in the example 4. In detail, the change ΔL in the height of the casing did not change and hydrogen gas was not produced until 1000 hours had elapsed in both examples 3 and 4. However, the change ΔL in the height of the casing varied after 1000 hours had elapsed. The change ΔL in the height of the casing in the example 4 was keener than the change ΔL in the height of the casing in the example 3.

Here, in the example 3, the difference between the natural immersion potential of the cathode and the natural immersion potential of the comparative example 1 that is the reference electrode was 0.42 V, and in the example 4, the difference between the natural immersion potential of the cathode and the natural immersion potential of the comparative example 1 that is the reference electrode was 0.56 V. From the results of the examples 3 and 4, in a range where the difference between the natural immersion potential of the cathode and the natural immersion potential of the comparative example 1 that is the reference electrode was less than 0.6 V, it is observed that the durability of the suppression effect for hydrogen gas becomes shorter as the difference between the natural immersion potential of the cathode and the natural immersion potential of the comparative example 1 that is the reference electrode gets closer to 0.6 V.

In contrast, as illustrated in FIG. 25, in the example 1 in which the difference between the natural immersion potential of the cathode and the natural immersion potential of the comparative example 1 that is the reference electrode was equal to or more than 0.6 V, the change ΔL in the height of the casing did not change and the production amount of hydrogen gas was kept being suppressed after 1000 hours and after 2000 hours had elapsed from the voltage application. That is, when the difference between the natural immersion potential of the cathode and the natural immersion potential of the comparative example 1 becomes equal to or more than 0.6 V, the durability of the suppression effect for hydrogen gas drastically increases.

In summary, it is observed that when the difference between the natural immersion potential of the cathode and the reference electrode becomes larger toward 0.6 V, the durability of the suppression effect for hydrogen gas becomes shorter though there is said effect, and the durability keenly increases when the difference exceeds 0.6 V.

The invention claimed is:

1. A cathode of an electrolytic capacitor which has only electrolyte solution as an electrolyte, comprising:
   a cathode foil formed of aluminum;
   an enlarged surface layer and oxide film formed on the cathode foil; and
   a conductive layer formed on a surface of the cathode foil, the conductive layer being a deposition from a slurry having entered into the enlarged surface layer and including carbon black as carbon material, a binder, and a solvent, and being free of activated carbon,
   wherein:
      the conductive layer has a configuration such that when current in a range of current density of leakage current of the electrolytic capacitor flows by electrochemical polarization, and when a reference electrolyte solution of the electrolytic capacitor includes ethylene glycol and azelaic acid, and does not include a nitro compound, the cathode potential corresponding to said current is higher than the natural immersion potential of a reference cathode foil formed of aluminum with a purity of 99.9% by 0.3 V or more,
      a polarization curve by the electrochemical polarization has a first potential range in which current produced by cathode reaction which reduces dissolved oxygen in the reference electrolyte solution is larger than current produced by cathode reaction which reduces hydrogen ions, and a second potential range in which the current produced by cathode reaction which reduces dissolved oxygen in the reference electrolyte solution is smaller than the current produced by cathode reaction which reduces hydrogen ions, and
      in the polarization curve, the range of the current density of the leakage current of the electrolytic capacitor corresponds to the first potential range in which the current produced by cathode reaction which reduces dissolved oxygen in the reference electrolyte solution is larger than current produced by cathode reaction which reduces hydrogen ions.

2. The cathode according to claim 1, wherein the range of current density of the leakage current of the electrolytic capacitor is equal to or more than 0.1 µA·cm$^{-2}$ and equal to or less than 0.3 µA·cm$^{-2}$.

3. The electrolytic capacitor comprising the cathode according to claim 1 and a capacitor element, wherein:
   the capacitor element includes anode foil on which dielectric oxide film is formed and the cathode foil, and
   the electrolyte solution, not including a nitro compound, is filled in the capacitor element.

4. The cathode according to claim 1 used in the electrolytic capacitor, wherein the electrolytic capacitor has withstand voltage of at least 100 V.

* * * * *